United States Patent
Orii et al.

(10) Patent No.: US 7,009,418 B2
(45) Date of Patent: Mar. 7, 2006

(54) INSPECTING METHOD, SEMICONDUCTOR DEVICE, AND DISPLAY APPARATUS

(75) Inventors: Toshihiko Orii, Kanagawa (JP); Osamu Akimoto, Tokyo (JP); Hitoshi Abe, Kanagawa (JP); Naoki Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 10/398,140

(22) PCT Filed: Aug. 2, 2002

(86) PCT No.: PCT/JP02/07916

§ 371 (c)(1),
(2), (4) Date: Jul. 7, 2003

(87) PCT Pub. No.: WO03/019504

PCT Pub. Date: Mar. 6, 2003

(65) Prior Publication Data

US 2004/0032278 A1 Feb. 19, 2004

(30) Foreign Application Priority Data

Aug. 3, 2001 (JP) ..................... 2001-236330

(51) Int. Cl.
*G01R 31/00* (2006.01)

(52) U.S. Cl. ..................... 324/770; 324/765
(58) Field of Classification Search ............... 324/765, 324/770, 158.1, 769; 345/98, 92, 208, 94
See application file for complete search history.

(56) References Cited

U.S. PATENT DOCUMENTS

| | | | | |
|---|---|---|---|---|
| 5,113,134 A | * | 5/1992 | Plus et al. | 324/770 |
| 5,233,448 A | * | 8/1993 | Wu | 349/40 |
| 5,377,030 A | | 12/1994 | Suzuki et al. | |
| 5,539,326 A | | 7/1996 | Takahashi et al. | |
| 5,576,730 A | * | 11/1996 | Shimada et al. | 345/98 |
| 5,994,916 A | | 11/1999 | Hayashi | |

FOREIGN PATENT DOCUMENTS

| | | |
|---|---|---|
| JP | 57-38498 | 3/1982 |
| JP | 01-101646 | 4/1989 |
| JP | 05-005866 | 5/1993 |
| JP | 08-184845 | 7/1996 |
| JP | 2000-304796 | 11/2000 |

* cited by examiner

*Primary Examiner*—David Zarneke
*Assistant Examiner*—Tung X. Nguyen
(74) *Attorney, Agent, or Firm*—Sonnenschein, Nath & Rosenthal LLP

(57) ABSTRACT

A method for testing a semiconductor substrate forming a liquid crystal display device, which method enables a potential change corresponding to a defective condition of pixel cell driving circuits to be detected accurately even when a ratio of pixel capacitance to wiring capacitance is lowered with decrease in size or increase in definition of the liquid crystal display device. The method includes: a charge retaining step for making pixel capacitances connected to a plurality of pixel switches selected from all pixel switches connected to one data line retain charge; and a detecting step for simultaneously detecting the charge retained in a plurality of the pixel capacitances in the charge retaining step from the one data line.

10 Claims, 7 Drawing Sheets

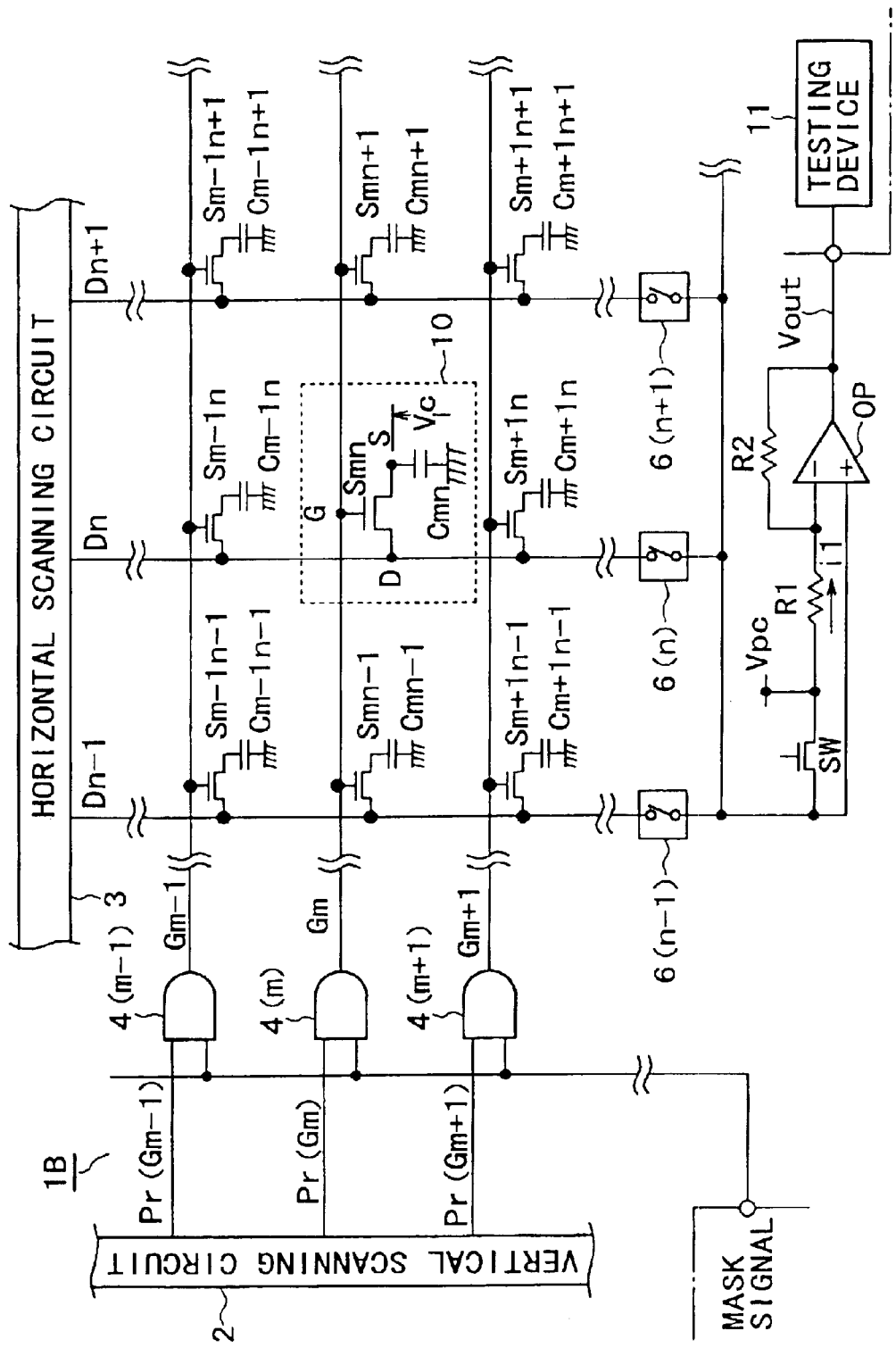
F I G. 5

1

INSPECTING METHOD, SEMICONDUCTOR DEVICE, AND DISPLAY APPARATUS

The present application is a 371 of PCT/JP02/07916 filed Aug. 02, 2002 which claim the benefit of priority to Japanese Application No. 2001-236330 filed Aug. 02, 2002.

BACKGROUND OF THE INVENTION

The present invention relates to a method for testing a semiconductor substrate on which pixel driving cells are formed so as to be arranged in a form of a matrix, a semiconductor device comprising a semiconductor substrate enabling the testing method, and a display apparatus having such a semiconductor device.

BACKGROUND ART

Liquid crystal display devices using an active matrix system are widely used in for example liquid crystal projector apparatus, liquid crystal display apparatus and the like. FIG. 6 shows an example of circuit configuration of such a liquid crystal display device 100 using the active matrix system. As is well known, a liquid crystal display device using the active matrix system has pixel cell driving circuits each having a pixel switch and a pixel capacitance connected to the pixel switch, for example, which circuits are formed so as to be arranged in a form of a matrix on a semiconductor substrate. The liquid crystal display device also has a structure in which a counter substrate having a common electrode formed thereon is opposed to the semiconductor substrate and a liquid crystal is sealed in between the semiconductor substrate and the counter substrate.

As shown as a pixel cell driving circuit 10 in a part enclosed by a broken line in FIG. 6, for example, each of the pixel cell driving circuits formed on the semiconductor substrate has a pixel switch S11, a pixel capacitance C11, and a pixel electrode P11. In this case, an N-channel type FET (Field Effect Transistor) is used as the pixel switch. The pixel switch S11 has a source connected to a common electrode (or a ground) via the pixel capacitance C11. A node of the source of the pixel switch S11 and the pixel capacitance C11 is connected with a pixel electrode P11. Incidentally, a "pixel cell" in the liquid crystal display device refers to a display region in a liquid crystal layer corresponding to each such pixel electrode. The pixel switch S11 has a gate connected with a gate line G1 extended from a vertical scanning circuit 2, and has a drain connected with a data line D1 extended from a horizontal scanning circuit 3. One pixel cell driving circuit is thus formed, and the pixel cell driving circuits are arranged in the form of the matrix on the semiconductor substrate as shown in FIG. 6.

The vertical scanning circuit 2 and the horizontal scanning circuit 3 each including a shift register, for example, are also formed on the semiconductor substrate. The vertical scanning circuit 2 sequentially scans gate lines G1, G2, . . . Gv extended in a horizontal direction. The horizontal scanning circuit 3 sequentially scans data lines D1, D2, D3 to Dh extended in a vertical direction.

The counter substrate having the common electrode supplied with a common potential Vcom is disposed so as to be opposed to the thus formed semiconductor substrate. The liquid crystal is sealed in between the semiconductor substrate 100 and the counter substrate disposed in such opposed positional relation to each other, whereby a liquid crystal layer 5 is formed. The liquid crystal display device 100 as a whole has such a structure.

FIGS. 7(a) to 7(j) are timing charts illustrating timing of driving pixel cells in the liquid crystal display device 100 with the above-described structure. The vertical scanning circuit 2 shifts an output thereof by one line by the shift register. Thereby the vertical scanning circuit 2 scans the gate lines in a vertical direction in order of the gate lines G1→G2→G3→ . . . on a line-sequential basis, as shown in FIGS. 7(a), 7(b), and 7(c). As shown in the figures, a power supply voltage VDD is applied to a gate line in a scanning period. In this period, a pixel switch connected to the gate line is in an on state. While scanning is not performed, the gate line is set to a ground potential VSS, and thus the pixel switch is in an off state.

FIG. 7(d) shows in enlarged dimension a section A in which scanning of the gate line G1 as shown in FIG. 7(a) is started. When the scanning of the gate line G1 is started as shown in FIG. 7(d), the pixel switches S11 to S1h arranged in a row connected to the gate line G1 are all brought into the on state. Within the period when the gate line G1 is scanned, the horizontal scanning circuit 3 applies voltages V1, V2, V3, . . . corresponding to data to the data lines in order of the data lines D1→D2→D3→ . . . in a horizontal direction as shown in FIGS. 7(e) to 7(g). That is, the horizontal scanning circuit 3 performs scanning in the horizontal direction. The horizontal scanning circuit 3 sequentially shifts the data lines to which to apply an output thereof by the shift register, whereby the above operation is obtained.

First, when the data line D1 is scanned as shown in FIG. 7(e), a charge corresponding to a level of the voltage V1 is stored via the pixel switch S11 which is in the on state at this time. That is, data is written to one pixel. Thereby a potential corresponding to the charge stored occurs at the pixel capacitance C11. The potential is shown as a potential V1 corresponding to a voltage value V1.

The potential V1 also appears at the pixel electrode P11. In response to a potential difference between the potential V1 of the pixel electrode P11 and the common potential Vcom of the common electrode opposed thereto, the liquid crystal of the liquid crystal layer 5 corresponding to a position of the pixel electrode P11 is excited. That is, the pixel cell is driven. As is understood from timing of scanning the data line D1 in FIG. 7(e) and charge storing timing in FIG. 7(h), the charge stored in the pixel capacitance, that is, the data continues to be retained even after the scanning of one data line (data writing) is ended to shift to scanning of the next data line, and thus continues to excite the liquid crystal (pixel cell).

After the data line D1 is thus scanned, the data line D2 is scanned, as shown in FIG. 7(f). Similarly, data is written to a pixel capacitance C12 via a pixel switch S12, as shown in FIG. 7(i). Thereafter the next data line D3 is scanned as shown in FIG. 7(g), and as shown in FIG. 7(j), data is written to a pixel capacitance C12 via a pixel switch S12.

When the scanning in the horizontal direction of one row is completed and with this the scanning of the gate line G1 is also completed, scanning of the next gate line G2 is then started, as shown in FIG. 7(b). As described with reference to FIGS. 7(e) to 7(j), also within a period when the gate line G2 is scanned, scanning in the horizontal direction is performed, that is, data is written to pixel cells in a horizontal line corresponding to the gate line G2. Thereafter, in a state in which the next gate line G3 is scanned as shown in FIG. 7(c), data is written to pixel cells in a horizontal line corresponding to the gate line G3 in timing shown in FIGS. 7(e) to 7(j). Thereafter the remaining gate lines are sequentially scanned, and within a period of scanning of each gate line, data is similarly written to pixel cells in a horizontal line corresponding to the gate line. Thus the vertical scanning circuit 2 and the horizontal scanning circuit 3 in the liquid crystal display device using the active matrix system sequentially drive the pixel cells by scanning the gate lines so as to drive the gate lines sequentially and scanning the data lines so as to drive the data lines sequentially to write data within a period of scanning one gate line.

The semiconductor substrate forming the liquid crystal display device of the above configuration may have a failure or a defect formed in the circuits in its fabrication process. That is, the semiconductor substrate has a possibility that a pixel cell driving circuit not operating properly may exist because of a short circuit in the pixel switch or the pixel capacitance, a disconnection or a short circuit in the gate line or the data line, or the like. Thus the circuits on the semiconductor substrate are tested for defects in a process of fabricating the liquid crystal display device.

Such testing of the circuits on the semiconductor substrate for defects is performed as follows, for example. First the data lines extended from the semiconductor substrate to be tested and a testing device are connected to each other. On the semiconductor substrate, the vertical scanning circuit 2 and the horizontal scanning circuit 3 perform driving in timing similar to that at the time of display. Specifically, the vertical scanning circuit 2 and the horizontal scanning circuit 3 drive the pixel cells in the same manner as described with reference to FIGS. 7(a) to 7(j), for example. In this case, a data line connected to a pixel cell driving circuit to which data is written should have a potential at a level corresponding to the written data when the pixel cell driving circuit operates properly. When there is some defect, the potential level should be other than a normal value. Accordingly, the potential level is detected by the testing device, that is, charge of the pixel capacitance is read from the data line, whereby the pixel cell driving circuit can be tested for defects.

However, in consideration for use in for example projector apparatus and the like, the liquid crystal display device has recently been required to have reduced size and a larger number of pixels per unit area for improvement of resolution. In this case, when the size of the liquid crystal display device as a whole is to be reduced to ½ without changing the number of pixels, or when the resolution is to be doubled without changing the size of the device, for example, in both cases the longitudinal/lateral dimension of a pixel cell needs to be reduced to about ½. Assuming that the pixel cell has a square shape, when the longitudinal/lateral dimension of the pixel cell is to be reduced to ½, the pixel capacitance will be reduced to ¼.

For fabrication reasons, there is a limit to reduction in size of a pixel switch within a pixel cell driving circuit. Thus, when the size of the pixel switch is reduced to substantially a limit and the pixel cell needs to be further reduced in size, the pixel capacitance has to be reduced in size. Hence, when the pixel cell driving circuit is to be reduced to ½ the size thereof, for example, and when the size of the pixel switch is already considerably small, the size of the pixel capacitance needs to be reduced more to less than ¼, because a ratio of reduction in the size of the pixel capacitance is increased.

Considering capacitance of the data line, assuming that width in the lateral direction of the data line is not changed when the longitudinal/lateral dimension of the liquid crystal display device is to be reduced to ½, for example, only length in the longitudinal direction of the data line is reduced to ½, and the size of the data line as its area is reduced to ½.

That is, the capacitance of the data line needs to be reduced by only ½. Thus, an imbalance in capacitance reduction rate occurs in that the pixel capacitance is reduced to ¼, whereas the capacitance of the data line is reduced only to ½.

Further, when the resolution is to be doubled without changing the size of the liquid crystal display device, the number of pixel switches connected to the data line is doubled even though the length of the data line is not changed. When the pixel switches cannot be reduced any further, the capacitance of the data line is increased by an amount corresponding to drain capacitance of the added pixel switches. Thus, as reduction in size of the pixel cell is furthered, a ratio of the data line capacitance to the pixel capacitance is increased, and so-called wiring capacitance becomes dominant. In such a case, when a charge of the pixel capacitance is to be read from the data line, a potential change in the data line may be so small as to be difficult to detect. Since the testing of the semiconductor substrate by the above-described method involves reading the charge of the pixel capacitance from the data line, it is difficult to conduct the test properly when the ratio of the wiring capacitance to the pixel capacitance is increased as described above.

Thus, in the present situation, it is required to actually display an image on a finished product as a liquid crystal display device after the filling of a liquid crystal, and then visually check the image, for example, to thereby test for pixel defects. When the test is thus conducted in a stage where the liquid crystal display device is completed, if a defect is found, for example, it is necessary to disassemble the liquid crystal display device and make repairs or discard the liquid crystal display device. That is, it is desirable from a viewpoint of fabrication efficiency and fabrication cost that the circuits formed on the semiconductor substrate be able to be tested in a stage where a wafer as the semiconductor circuit substrate is formed, for example, before being incorporated as the liquid crystal display device.

It is accordingly an object of the present invention to provide a semiconductor substrate testing method that properly detects a failure in pixel cell driving circuits before being completed as a semiconductor device even when the ratio of the wiring capacitance to the pixel capacitance is increased with decrease in size or increase in definition of the semiconductor device having the pixel cell driving circuits, a semiconductor device including a semiconductor substrate enabling the testing method, and a display apparatus having such a semiconductor device.

SUMMARY OF THE INVENTION

According to the present invention, there is provided a method for testing a semiconductor substrate, the semiconductor substrate being formed with pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data, the method characterized by including: a charge retaining step for making pixel capacitances connected to a plurality of pixel switches selected from all pixel switches connected to one data line retain charge; and a detecting step for simultaneously detecting the charge retained in a plurality of the pixel capacitances in the charge retaining step from the one data line.

According to the present invention, there is provided a semiconductor device characterized by including, on a semiconductor substrate: pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data; horizontal scanning means for scanning in a horizontal direction by applying a data signal to the data lines in predetermined timing; and vertical scanning means for scanning in a vertical direction by sequentially outputting a scanning signal for turning on the pixel switch to the pixel switch control lines, and for testing, generating a testing scanning signal for simultaneously turning on an arbitrary plurality of pixel switches on one data line.

Further, according to the present invention, there is provided a display apparatus including: a semiconductor substrate having a common electrode; a counter substrate disposed opposite to the semiconductor substrate; and a liquid crystal layer interposed between the semiconductor substrate and the counter substrate. The semiconductor substrate characterized by including: pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data; horizontal scanning means for scanning in a horizontal direction by applying a data signal to the data lines in predetermined timing; and vertical scanning means having means for scanning in a vertical direction by sequentially outputting a scanning signal for turning on the pixel switch to the pixel switch control lines, and for testing, generating a testing scanning signal for simultaneously turning on an arbitrary plurality of pixel switches on one data line.

Each of the above constitutions includes steps for making an arbitrary plurality of pixel capacitances of pixel capacitances in pixel cell driving circuits connected to one data line retain charge and simultaneously reading and detecting the charge from the same data line. Or a constitution that can simultaneously turn on the plurality of pixel switches connected to one data line is provided, whereby a potential corresponding to the charge stored in the plurality of pixel capacitances is obtained simultaneously in the same data line. In the present invention, reading the charge stored in the plurality of pixel capacitances from the same data line means that a total amount of charge of the plurality of pixel capacitances can be detected. Thereby a potential change obtained in the data line can be made greater than when a charge stored in one pixel capacitance is read, for example.

Further, according to the present invention, there is provided a method for testing a semiconductor substrate, the semiconductor substrate being formed with pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data, the method characterized by including: a potential generating step for generating, in a data line, a potential level corresponding to charge retained in a pixel capacitance; an amplifying step for amplifying the potential level generated in the data line in the potential generating step by an amplifying circuit formed on the semiconductor substrate; and a detecting step for detecting an amplification output obtained in the amplifying step.

Further, according to the present invention, there is provided a semiconductor device characterized by including, on a semiconductor substrate: pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data; vertical scanning means for scanning in a vertical direction by sequentially outputting a scanning signal for turning on the pixel switch to the pixel switch control lines; horizontal scanning means for scanning in a horizontal direction by applying a data signal to the data lines in predetermined timing; and amplifying means for amplifying a potential level occurring in a data line for output to an external testing device.

Further, according to the present invention, there is provided a display apparatus characterized by including: a semiconductor substrate having a common electrode; a counter substrate disposed opposite to the semiconductor substrate; and a liquid crystal layer interposed between the semiconductor substrate and the counter substrate; wherein the semiconductor substrate includes: pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data; vertical scanning means for scanning in a vertical direction by sequentially outputting a scanning signal for turning on the pixel switch to the pixel switch control lines; horizontal scanning means for scanning in a horizontal direction by applying a data signal to the data lines in predetermined timing; and amplifying means for amplifying a potential level occurring in a data line for output to an external testing device.

In each of the above constitutions, the potential level obtained in the data line is amplified by the amplifying means (amplifying circuit) formed in the substrate. When a charge stored in a pixel capacitance is read from a data line for testing, a potential change in the data line is detected. The amplifying effect of the present invention enables a level variation caused by the potential change to be enlarged for detection.

Further, according to the present invention, a method for testing a semiconductor substrate, the semiconductor substrate being formed with pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data, is comprised as follows. The method is characterized by including: a charge retaining step for making pixel capacitances connected to a plurality of pixel switches selected from all pixel switches connected to one data line retain charge; a potential generating step for generating, in the one data line, a potential level corresponding to the charge retained in a plurality of the pixel capacitances in the charge retaining step; an amplifying step for amplifying the potential level generated in the data line in the potential generating step by an amplifying circuit formed on the semiconductor substrate; and a detecting step for detecting an amplification output obtained in the amplifying step.

Further, according to the present invention, there is provided a semiconductor device characterized by including, on a semiconductor substrate: pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data; horizontal scanning means for scanning in a horizontal direction by applying a data signal to the data lines in predetermined timing; vertical scanning means having means for scanning in a vertical direction by sequentially outputting a scanning signal for turning on the pixel switch to the pixel switch control lines, and for testing, generating a testing scanning signal for simultaneously turning on an arbitrary plurality of pixel switches on one of the data lines; and amplifying means for amplifying a potential level occurring in the data line for output to an external testing device.

Further, according to the present invention, there is provided a display apparatus characterized by including: a semiconductor substrate having a common electrode; a counter substrate disposed opposite to the semiconductor substrate; and a liquid crystal layer interposed between the semiconductor substrate and the counter substrate; wherein the semiconductor substrate includes: pixel cell driving circuits arranged in a form of a matrix in correspondence with positions of intersection of data lines and pixel switch control lines, the pixel cell driving circuits each including a pixel switch and a pixel capacitance connected to the pixel switch, for retaining pixel data; horizontal scanning means for scanning in a horizontal direction by applying a data signal to the data lines in predetermined timing; vertical scanning means having means for scanning in a vertical direction by sequentially outputting a scanning signal for turning on the pixel switch to the pixel switch control lines, and for testing, generating a testing scanning signal for simultaneously turning on an arbitrary plurality of pixel switches on one data line; and amplifying means for amplifying a potential level occurring in the data line for output to an external testing device.

Each of the above constitutions includes steps for making an arbitrary plurality of pixel capacitances of pixel capacitances in pixel cell driving circuits connected to one data line retain charge and simultaneously reading and detecting the charge from the same data line. Or a constitution that can simultaneously turn on the plurality of pixel switches connected to one data line is provided, whereby a potential corresponding to the charge stored in the plurality of pixel capacitances is obtained simultaneously in the same data line. Thereby the potential corresponding to a total amount of charge stored in the plurality of pixel capacitances can be generated in one data line. Thus, a potential change greater than when a charge of one pixel capacitance is read into the data line, for example, can be obtained. Further, the thus obtained potential level corresponding to the charge of the plurality of pixel capacitances is amplified, whereby the potential level change detected for testing is made even greater. Thus, according to the present invention, the two constitutions for enlarging potential level change, one generating the potential corresponding to a total amount of charge stored in the plurality of pixel capacitances, and the other amplifying the potential, are used in combination, thereby making more obvious the potential level change corresponding to the charge of the pixel capacitances.

BRIEF DESCRIPTION OF DRAWINGS

FIG. 5 is a diagram showing a circuit configuration of a liquid crystal display device as a third embodiment of the present invention;

DETAILED DESCRIPTION OF THE PRESENTLY PREFERRED EMBODIMENTS

Preferred embodiments of the present invention will hereinafter be described. An active matrix type liquid crystal display device used in for example liquid crystal projector apparatus and various other video apparatus and electronic apparatus will be taken as the embodiments.

Figure 1:
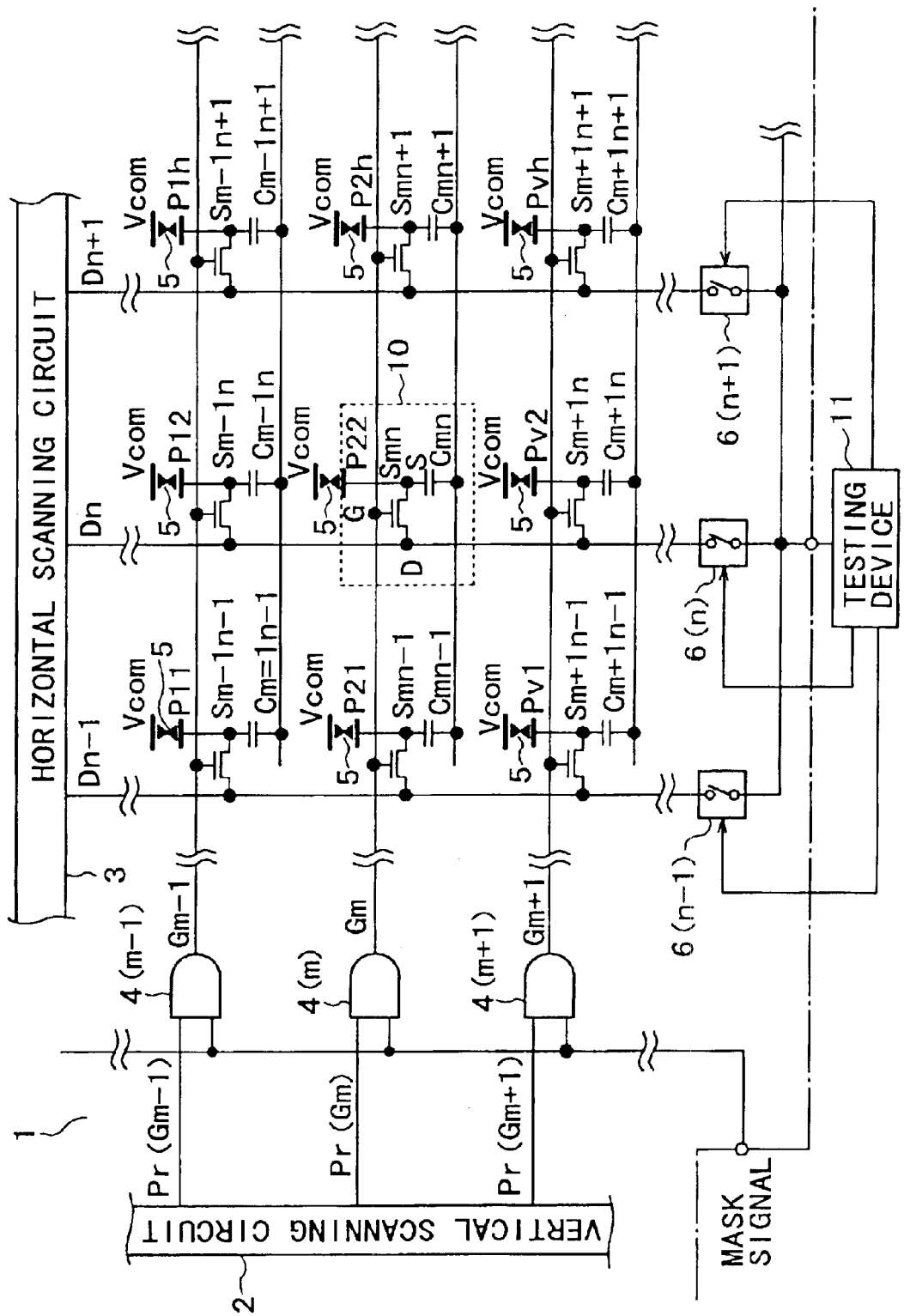
FIG. 1 is a diagram showing a circuit configuration of a liquid crystal display device corresponding to a first embodiment of the present invention.

FIG. 1 shows an example of circuit configuration of a liquid crystal display device according to a first embodiment of the present invention. As a fundamental structure of the liquid crystal display device 1 shown in FIG. 1, necessary circuits including at least pixel cell driving circuits arranged in a form of a matrix, for example, are formed on a semiconductor substrate. A counter substrate having a common electrode formed thereon is opposed to the semiconductor substrate, and a liquid crystal is sealed in between the semiconductor substrate and the counter substrate.

In the first embodiment, a silicon substrate of a silicon (Si) material is used for the semiconductor substrate. The semiconductor substrate has thereon the pixel cell driving circuits 10 formed so as to be arranged in a form of a matrix, and also a vertical scanning circuit 2, a horizontal scanning circuit 3, an AND gate 4 inserted in each of gate lines, and a switch 6 inserted in each of data lines.

A circuit configuration of the pixel cell driving circuits 10 formed on the semiconductor substrate will first be described by taking as an example a part shown enclosed by a broken line in FIG. 1. As shown in the figure, one pixel cell driving circuit 10 has a pixel switch Smn, a pixel capacitance Cmn, and a pixel electrode P22. The pixel switch Smn has a structure of a FET (Field-Effect Transistor), for example. The pixel switch Smn has a gate connected to a gate line Gm and a drain connected to a data line Dn. Incidentally, each gate line and data line is formed on the semiconductor substrate. The pixel switch Smn also has a source connected to one terminal of the pixel capacitance Cmn. Another terminal of the pixel capacitance Cmn is in this case connected to the common electrode. A node of the source of the pixel switch and the pixel capacitance Cmn is connected to the pixel electrode P22. The pixel cell driving circuits 10 thus formed are arranged along a row direction and a column direction in the form of a matrix as shown in FIG. 1. On the semiconductor substrate having the pixel cell driving circuits 10 thus formed, pixel electrodes P of the pixel cell driving circuits 10 are arranged in the form of a matrix and appear on the surface.

The vertical scanning circuit 2 is formed with a shift register, for example, and is provided to scan each row (one horizontal line) in a vertical direction. Specifically, at the time of display, the vertical scanning circuit 2 scans the gate lines in order of gate lines Gm−1→Gm→Gm+1 . . . by outputting a scanning signal (scanning pulse) in a form of a pulse in each horizontal scanning period. For example, when the gate line Gm is driven by the scanning of the vertical scanning circuit 2, a gate voltage is applied to gates of pixel switches (Smn−1, Smn, Smn+1) of one row connected to the gate line Gm, whereby the pixel switches (Smn−1, Smn, Smn+1) are turned on.

In the first embodiment, however, AND gates 4(m−1), 4(m), 4(m+1) are interposed between the vertical scanning circuit 2 and the respective gate lines (Gm−1, Gm, Gm+1 . . . ) to test the semiconductor substrate. The AND gates 4(m−1), 4(m), 4(m+1) have one input terminal connected with gate lines Pr(Gm−1), Pr(Gm), Pr(Gm+1), respectively, that are extended from the vertical scanning circuit 2, and have another input connected with a common mask signal.

For example, the vertical scanning circuit 2 outputs a scanning signal corresponding to an H level to the gate line Pr(Gm) in correspondence with the gate line Gm to perform scanning. The scanning signal at this time is inputted to one input terminal of the AND gate 4(m). At this time, when a mask signal at an L level is inputted to the AND gate 4(m), an output of the AND gate 4(m) is at an L level. Hence the scanning signal is not outputted from the gate line Gm, so that the pixel switches (Smn−1, Smn, Smn+1) are off (masked). On the other hand, when a mask signal at an H level is inputted and thereby the output of the AND gate 4(m) is set to an H level, the scanning signal is outputted to the gate line Gm, so that the pixel switches (Smn−1, Smn, Smn+1) are turned on.

It is to be noted that such gate line masking operation by the AND gate 4 and the mask signal is performed at the time of a test, as described above, and that mask control by the AND gate 4 is not effected at the time of display.

The horizontal scanning circuit 3 is also formed with a shift register and the like. The horizontal scanning circuit 3 sequentially shifts externally inputted data for one horizontal line, and thus drives data lines Dn−1, Dn, Dn+1 such that the data lines Dn−1, Dn, Dn+1 are sequentially scanned.

Further, in the first embodiment, switches 6(n−1), 6(n), 6(n+1) are connected to the respective data lines Dn−1, Dn, Dn+1 . . . , as shown in FIG. 1. These switches 6 are formed on the semiconductor substrate, and formed as a CMOS type circuit, for example. The switches 6 thus provided are used to select a data line to be connected to an external testing device 11 at the time of a test, which will be described later. In this case, the testing device 11 controls opening and closing of the switches.

Thus, the AND gates 4 and the switches 6 required at the time of testing in addition to the pixel cell driving circuits 10, the data lines, the gate lines, the vertical scanning circuit 2, and the horizontal scanning circuit 3 as described above are formed on the semiconductor substrate of the first embodiment.

The counter substrate, on which the common electrode supplied with a common potential Vcom is formed, is disposed so as to be opposed to the thus formed semiconductor substrate. The liquid crystal is sealed in between the semiconductor substrate and the counter substrate, whereby a liquid crystal layer 5 is formed. Thus, the liquid crystal display device 1 according to the first embodiment is formed.

An operation at the time of image display of the thus formed liquid crystal display device 1 is briefly as follows.

In the first embodiment, in normal display, the AND gates 4 are not used, and therefore the mask signal is fixed at the H level at all times, for example. Alternatively, though not shown, the gate lines Pr(Gm−1), Pr(Gm), Pr(Gm+1) extended from the vertical scanning circuit 2 are made to pass the AND gates 4 to be connected to the gate lines Gm−1, Gm, Gm+1, respectively. That is, it suffices to form the circuits such that the vertical scanning circuit 2 directly scans the gate lines Gm−1, Gm, Gm+1 . . .

Figure 7:
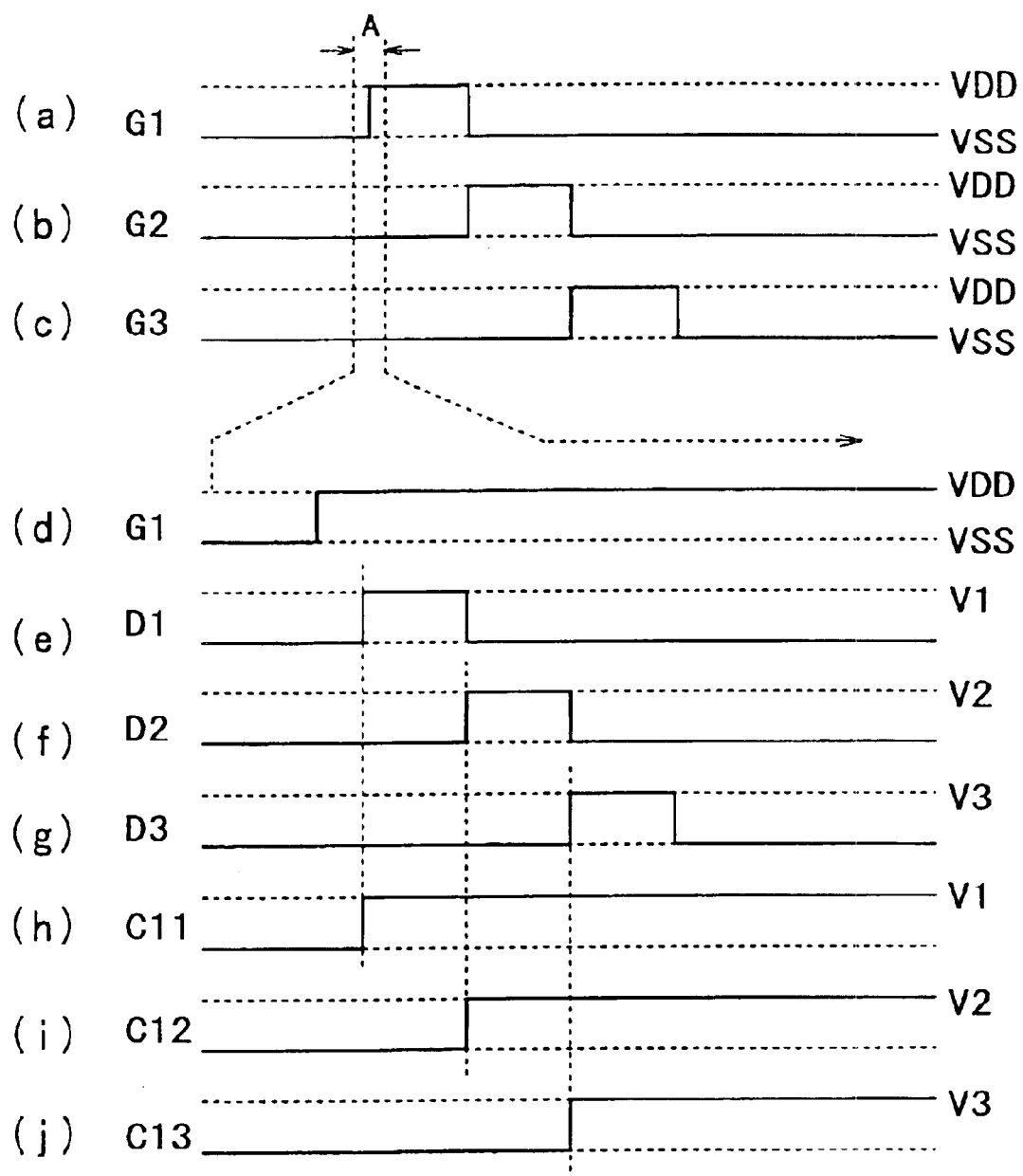
FIGS. 7(a) to 7(j) are timing charts of display driving timing in the liquid crystal display device.

The scanning of the vertical scanning circuit 2 and the horizontal scanning circuit 3 at the time of display may be performed in similar timing to that described earlier with reference to FIG. 7. Specifically, the vertical scanning circuit 2 shifts the output in timing after each horizontal scanning period through operation of the shift register, and thereby sequentially scans the gate lines from a first row to a last row. Thereby, in a certain horizontal scanning period, for example, the gate voltage is applied to pixel switches Sm−1n−1, Sm−1n, Sm−1n+1 of a row connected to the gate line Gm−1, whereby the pixel switches Sm−1n−1, Sm−1n, Sm−1n+1 are turned on. In a next horizontal scanning period, the pixel switches Sm−1n−1, Sm−1n, Sm−1n+1 are turned off, and the pixel switches Smn−1, Smn, Smn+1 of a row connected to the next gate line Gm are turned on. Thereafter the remaining gate lines are scanned in a similar manner.

Within a period when one gate line is scanned as described above, the shift register in the horizontal scanning circuit 3 operates to sequentially drive the data lines from a first column to a last column. Driving a data line in this case refers to outputting a voltage value corresponding to pixel data from the horizontal scanning circuit 3 to the data line. Now, suppose for example that the data line Dn−1 is driven within a period when the gate line Gm is scanned. At this time, the pixel switches Smn−1, Smn, Smn+1 whose gates are connected to the gate line Gm are on. Since the data line Dn−1 is driven, a charge corresponding to a voltage value (data) applied to the data line Dn−1 is stored in a pixel capacitance Cmn−1 connected to the pixel switch Smn−1 at an intersection of the gate line Gm and the data line Dn−1 via a drain and a source of the pixel switch Smn−1. A potential corresponding to the amount of charge stored occurs across the pixel capacitance Cmn−1. That is, the data is written to the pixel capacitance Cmn−1. The potential generated across the pixel capacitance Cmn−1 by the writing of the data also occurs at the pixel electrode P21 connected to the source of the same pixel switch Smn−1.

Then, when the writing of the data through the data line Dn−1 is completed, the data written to the pixel capacitance Cmn−1 is retained, and the next data line Dn is driven. Hence, in this case, data is written to the pixel capacitance Cmn connected to the pixel switch Smn at an intersection of the gate line Gm and the data line Dn, whereby a potential occurs at the pixel electrode P22.

The common electrode supplied with the potential Vcom is disposed so as to be opposed to the pixel electrode P with the liquid crystal layer 5 interposed between the common electrode and the pixel electrode P. When the potentials corresponding to the data sequentially occur at the pixel electrodes P21 and P22 as described above, the liquid crystal of the liquid crystal layer 5 interposed between the common electrode and the pixel electrode P21 responds to a potential difference between the potential of the pixel electrode P21 and the potential Vcom, and is thus excited. That is, the pixel cells are sequentially driven.

As described above, the horizontal scanning circuit 3 sequentially drives the data lines within the period of scanning the gate line Gm. When the driving of pixels of one horizontal line is completed, the vertical scanning circuit 2 ends the scanning of the gate line Gm and then scans the next gate line Gm−1. Within the period of scanning the gate line Gm−1, the horizontal scanning circuit 3 sequentially drives the data lines to similarly drive pixels of one horizontal line. Such an operation is performed for all horizontal lines, whereby the writing of data for one screen is completed. The writing of data for one screen is repeated in field cycles, for example, whereby an image is displayed.

In the first embodiment, the semiconductor substrate forming the liquid crystal display device 1 is tested for failures or defects in the circuits formed on the semiconductor substrate. This test is conducted as follows, for example.

FIGS. 2(a) to 2(g) show timing of pixel cell driving performed in required steps at the time of the testing of the semiconductor substrate to which the first embodiment corresponds. The driving timing shown in the figures in effect enables a plurality of gate lines to be activated and deactivated simultaneously.

Figure 2:
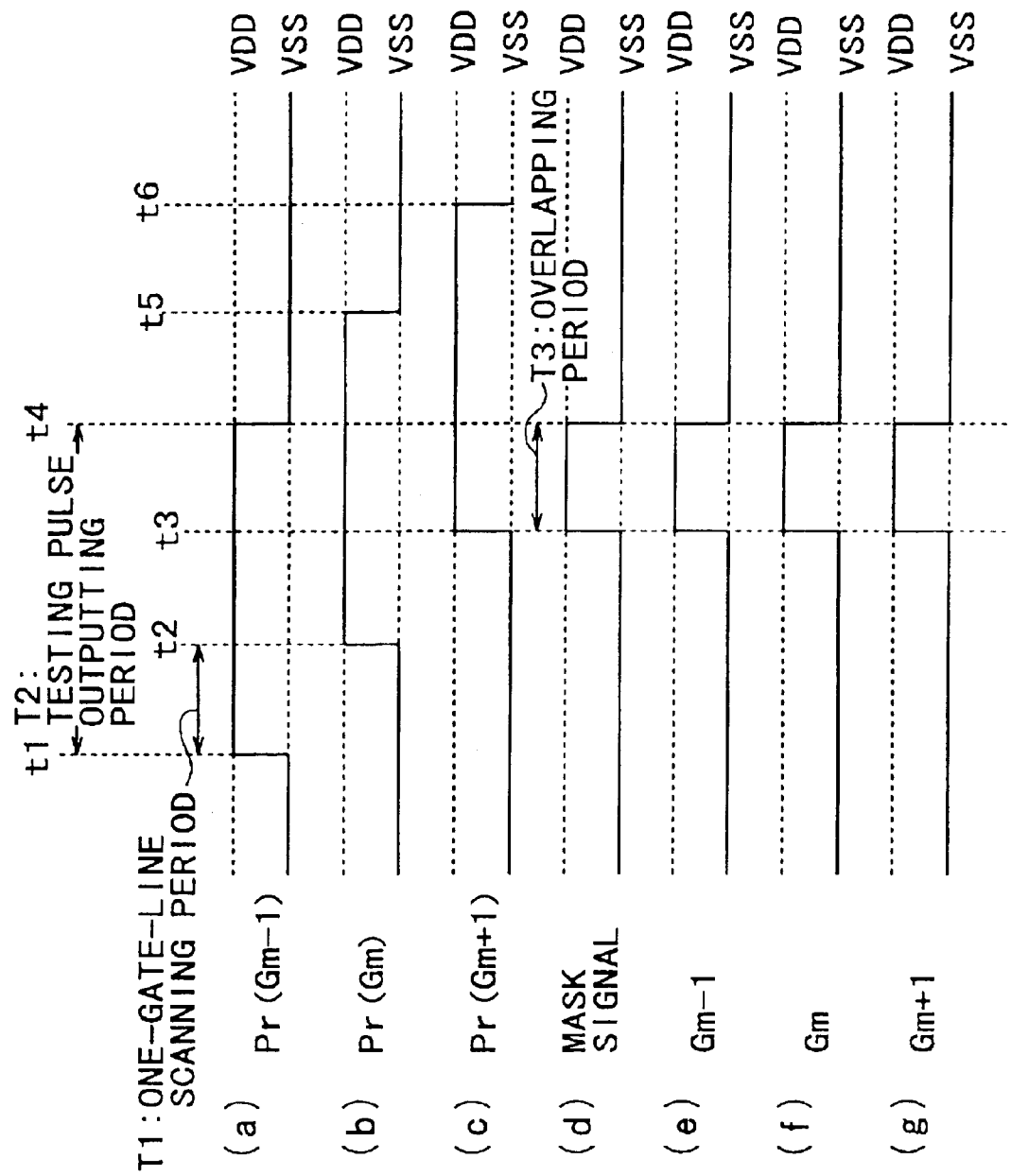
FIGS. 2(a) to 2(g) are timing charts of operation for simultaneously turning on/off pixel switches which operation is performed in testing in the first embodiment.

As shown in FIG. 2(a), the shift register within the vertical scanning circuit 2 is made to output a scanning pulse of a predetermined duration longer than a normal period for scanning one gate line, for example, to the gate line Pr(Gm−1). Specifically, suppose that the normal period for scanning one gate line corresponds with a time length of a period from t1 to t2. In this case, the scanning pulse is outputted for a period from the time t1 to t4, which is three times longer than the normal period. As shown in FIG. 7(b), the output of a scanning pulse to the next gate line Pr(Gm) is for example started in timing of a time t2, which timing is shifted from the time t1 by the normal period for scanning one gate line. Also in this case, a width of the pulse outputted is three times greater than the normal period for scanning one gate line. The pulse is therefore outputted for a period from t2 to t5. Similarly, a scanning pulse of a pulse width three times greater than the normal period for scanning one gate line is outputted to the next gate line Pr(Gm+1) from a time shifted from the time t2 by the normal period for scanning one gate line. That is, the pulse is outputted for a period from t3 to t6.

The gate lines Pr(Gm−1), Pr(Gm), and Pr(Gm+1) are scanned with the pulse length three times greater than the normal period for scanning one gate line, as described above, whereby an overlapping period T3 in which the scanning pulse outputs overlap one another is formed as shown in the figures in a period from t1 to t6 when these gate lines are scanned. In the first embodiment, as shown in FIG. 2(d), the mask signal is at the L level during a period from t1 to t3 preceding the overlapping period T3 in the period from t1 to t6 when the gate lines (Gm−1), Pr(Gm), and Pr(Gm+1) are scanned. Thereby the L level (ground potential Vss) is outputted from the AND gates 4(m−1), 4(m), and 4(m+1). In this case, since the ground potential Vss is outputted as the L level, the gate lines Gm−1, Gm, and Gm+1 connected to the outputs of the AND gates 4(m−1), 4(m), and 4(m+1) are at the ground potential Vss in the period from t1 to t3, as shown in FIGS. 2(e), 2(f), and 2(g). Hence the pixel switches connected to the gate lines Gm−1, Gm, and Gm+1 are in an off state in the period from t1 to t3. That is, in this period, the pulses outputted from the vertical scanning circuit 2 are masked by the mask signal.

Then, in timing in which the time t3, or the time of a start of the overlapping period T3 arrives, the mask signal is changed to the H level (power supply potential VDD), as shown in FIG. 2(d). At this time, the pulses are simultaneously outputted in the gate lines Pr(Gm−1), Pr(Gm), and Pr(Gm+1). Thus, since the mask signal is changed to the H level, the H level represented by the power supply potential VDD is outputted from the AND gates 4(m−1), 4(m), and 4(m+1), and thereby the power supply potential VDD is obtained in the gate lines Gm−1, Gm, and Gm+1. That is, the masking by the mask signal is cleared, and the gate lines Gm−1, Gm, and Gm+1 are simultaneously activated at the time t3, as shown in FIGS. 2(e), 2(f), and 2(g).

Thereafter, at the time t4 when the overlapping period T3 ends, the mask signal is changed to the L level. Thereby the masking by the mask signal is resumed at the time t4, so that the gate lines Gm−1, Gm, and Gm+1 is set to the ground potential Vss. That is, the gate lines Gm−1, Gm, and Gm+1 are deactivated simultaneously.

The shift register within the vertical scanning circuit 2 and the AND gates 4 in the first embodiment thus make it possible to simultaneously activate and deactivate the plurality of consecutive gate lines. It is to be noted that in this case, the three gate lines are activated/deactivated simultaneously; however, as is understood from the description with reference to FIGS. 2(a) to 2(g), the number of gate lines to be activated/deactivated simultaneously can be varied arbitrarily by making a necessary change in signal output timing or the like, such for example as by changing the width of a pulse to be outputted from the vertical scanning circuit 2 according to the number of gate lines to be activated/ deactivated simultaneously. The number of gate lines to be activated/deactivated simultaneously is in practice to be changed as appropriate according to conditions at the time of the test or the like.

Next, an example of a procedure for testing the semiconductor substrate as the first embodiment will be described on the assumption that the plurality of gate lines can be scanned simultaneously as described above.

Step 1: In this case, suppose that the three pixel cell driving circuits 10 connected to the data line Dn in FIG. 1 are selected to be tested. That is, the pixel cell driving circuits 10 having the pixel switches Sm−1n, Smn, and Sm+1n connected to the data line Dn are to be tested. Further, in correspondence with the pixel cell driving circuits to be tested, of the switches 6, only the switch 6(n) connected to the data line Dn is turned on, and the other switches 6 are turned off. Thereby the data line Dn is connected to the testing device 11. In this step 1, data is written to the three pixel capacitances Cm−1n, Cmn, and Cm+1n in these pixel cell driving circuits 10. In order to write the data, as described with reference to FIGS. 2(a) to 2(g), for example, the vertical scanning circuit 2 simultaneously activates the gate lines Gm−1, Gm, and Gm+1 to turn on the pixel switches Sm−1n, Smn, and Sm+1n, and the horizontal scanning circuit 3 outputs the data to the data line Dn. Thereby the data is written to each of the pixel capacitances Cm−1n, Cmn, and Cm+1n via the drains and sources of the pixel switches Sm−1n, Smn, and Sm+1n in the on state. That is, a charge is stored in each of the pixel capacitances Cm−1n, Cmn, and Cm+1n. It is to be noted that the data does not necessarily need to be written to the pixel capacitances Cm−1n, Cmn, and Cm+1n simultaneously; for example, the gate lines Gm−1, Gm, and Gm+1 may be activated sequentially, and the data may be sequentially outputted to the data line Dn in timing in which the gate lines are activated.

Step 2: When the writing of the data to the pixel capacitances Cm−1n, Cmn, and Cm+1n in the step 1 is completed, the gate lines Gm−1, Gm, and Gm+1 that have been activated are deactivated. When the writing of the data in the step 1 is performed in the scanning timing shown in FIGS. 2(a) to 2(g), for example, the deactivation can be realized by setting the mask signal to the L level, as shown as the operation at the time t4 in FIGS. 2(a) to 2(g). When the gate lines Gm−1, Gm, and Gm+1 are deactivated with the data thus written in the pixel capacitances Cm−1n, Cmn, and Cm+1n, the pixel switches Sm−1n, Smn, and Sm+1n are brought into an off state, whereby the charge stored in the pixel capacitances Cm−1n, Cmn, and Cm+1n by the writing of the data is retained without being released.

Step 3: When the charge is retained in the pixel capacitances Cm−1n, Cmn, and Cm+1n, the horizontal scanning circuit 3 or the testing device charges the data line Dn with an arbitrary voltage. Thereby the data line Dn is brought into a state of high impedance.

Step 4: Next, under the state of high impedance of the data line Dn, the gate lines Gm−1, Gm, and Gm+1 are activated simultaneously as shown in FIGS. 2(a) to 2(g). Thereby the pixel switches Sm−1n, Smn, and Sm+1n that have been in the off state are simultaneously changed to an on state. Thereby a potential change corresponding to the charge stored in the pixel capacitances Cm−1n, Cmn, and Cm+1n connected to the pixel switches Sm−1n, Smn, and Sm+1n appears in the data line Dn. That is, the potential change corresponding to a total amount of charge of the three pixel capacitances Cm−1n, Cmn, and Cm+1n appears.

Step 5: The potential change corresponding to the total amount of charge of the three pixel capacitances Cm−1n, Cmn, and Cm+1n which potential change appears in the data line Dn as described above is detected in the testing device 11 connected to the data line Dn via the switch 6(n). The testing device 11 provides a test result on the basis of the potential change that appears in various forms depending on the condition of a circuit failure or defect.

Items to be tested for on the basis of the potential change detected include for example appropriateness of a value of the pixel capacitances, pixel data writing time, a short circuit in the pixel capacitances, a short circuit in the gate lines and the data lines, disconnection, and the like, without particular limitation thereto.

The test procedure of the first embodiment has been described above. When the circuits being tested are to be changed to pixel cell driving circuits 10 connected to another data line, the testing device 11 effects control to change the switches 6, for example. When the circuits being tested are to be changed from the pixel cell driving circuits 10 connected to the data line Dn to the pixel cell driving circuits 10 connected to the data line Dn+1, for example, it suffices to effect control so as to turn off the switch 6(n) that has been turned on and turn on the switch 6(n+1).

According to such a test method of the first embodiment, a range of potential change appearing in a data line, for example, corresponds to a total amount of charge retained by a plurality of pixel capacitances. That is, a range of potential change greater than a potential change appearing due to a charge retained by one pixel capacitance can be obtained.

As described above, the ratio of the pixel capacitance to the data line capacitance becomes higher than ever with decrease in size or increase in definition of the liquid crystal display device, for example. With the conventional test method that drives the pixel cells one by one and detects a potential change appearing due to a charge retained by one pixel capacitance, it is difficult to obtain an accurate test result. Thus, in the present situation, it is required to complete the liquid crystal display device, display an image on the liquid crystal display device, and then visually check the liquid crystal display device, without testing the semiconductor substrate alone.

On the other hand, in the first embodiment, a noticeable potential change sufficient to obtain a correct test result appears in the data line, thus making it possible to accurately test the semiconductor substrate even with a high ratio of the data line capacitance to the pixel capacitance. Thus testing is easily realized in a stage where circuits are formed on the semiconductor substrate before fabrication of the liquid crystal display device. Further, in the first embodiment, a plurality of pixel cell driving circuits 10 are tested simultaneously. It is therefore possible to conduct the test more efficiently than when each pixel cell driving circuit is driven and tested, for example, as has been conventional.

Figure 3:
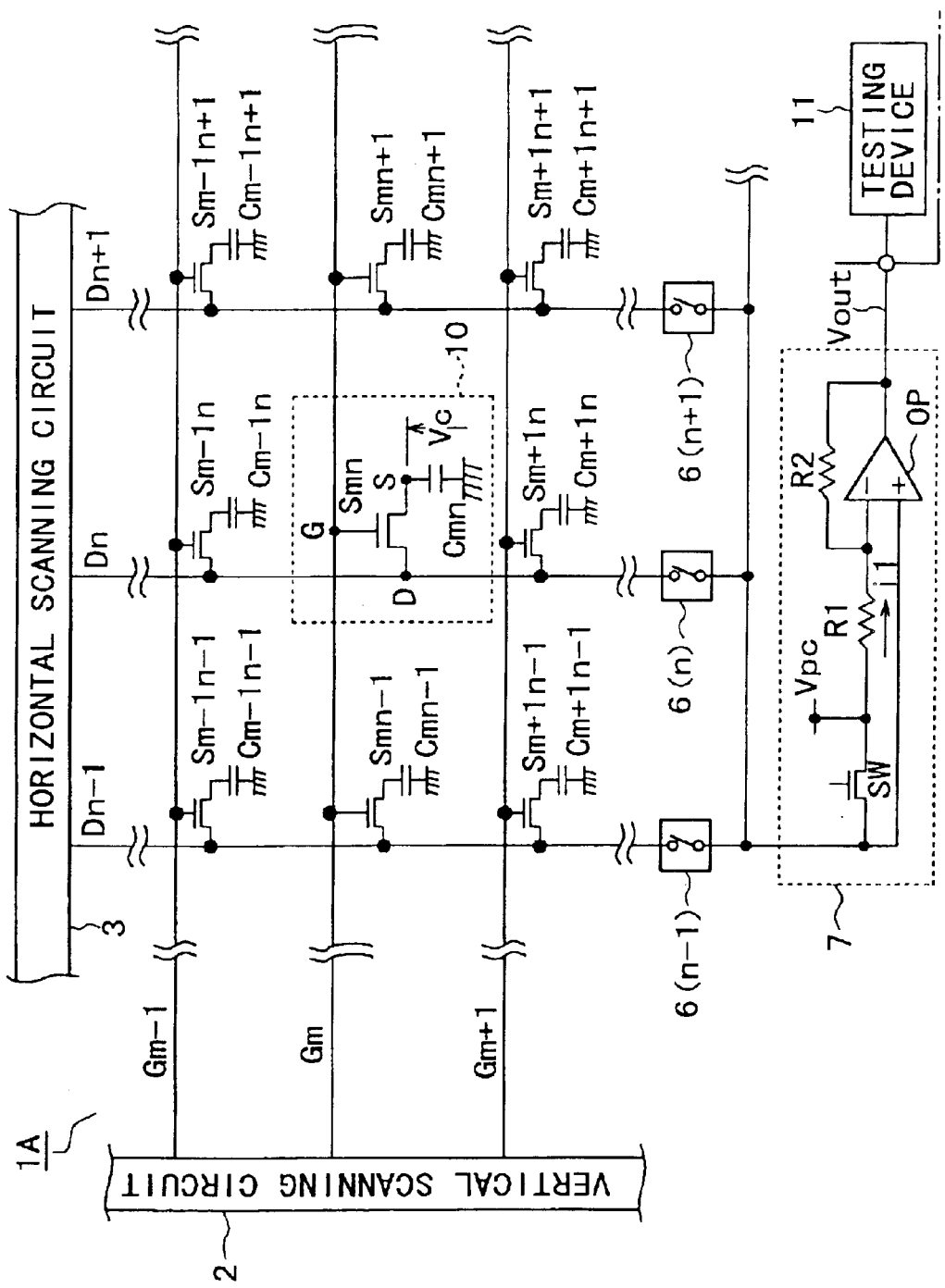
FIG. 3 is a diagram showing a circuit configuration of a liquid crystal display device corresponding to a second embodiment of the present invention.

A second embodiment of the present invention will next be described. FIG. 3 shows a circuit configuration of a liquid crystal display device 1A corresponding to the second embodiment. Incidentally, in FIG. 3, the same parts as in FIG. 1 are identified by the same reference numerals, and description thereof will be omitted in the following. FIG. 3 mainly shows a circuit portion formed on a semiconductor substrate in the liquid crystal display device 1A. Therefore a liquid crystal layer 5 and a counter electrode to which a common potential Vcom is applied are not shown in FIG. 3. Also, of parts actually formed on the semiconductor substrate, a pixel electrode connected to a source of each pixel switch is not shown in FIG. 3. Further, a control line for a testing device 11 to effect on-off control of a switch 6 is not shown in FIG. 3.

In the circuit shown in FIG. 3, the gate circuits provided between the vertical scanning circuit 2 and the gate lines in the circuit shown in FIG. 1, for example, are omitted. That is, in the second embodiment, gate lines (Gm−1, Gm, Gm+1) are directly extended from a vertical scanning circuit 2. In this case, a terminal portion of a pixel capacitance is connected to a ground rather than a common electrode; however, as in FIG. 1, a circuit configuration in which the terminal portion of the pixel capacitance is connected to the common electrode may be used. The second embodiment is characterized by an amplifier circuit 7 provided between outputs of switches 6 and an output terminal Vout connected with the testing device 11. The amplifier circuit 7 is also formed on the semiconductor substrate.

The amplifier circuit 7 in this case has a line on a side of the outputs of the switches 6 which line is connected to one terminal of a switch SW and connected to a noninverting input terminal of an operational amplifier OP. That is, data lines connected with drains of pixel switches are connected to an input of the amplifier circuit 7 via the switches 6. The switch SW is an N-channel type field-effect transistor, for example. The switch SW has another terminal connected to a potential Vpc. The potential Vpc is connected to an inverting input terminal of the operational amplifier OP via a resistance R1. The output terminal and the inverting input terminal of the operational amplifier OP are connected to each other via a resistance R2. The amplifier circuit 7 is thus formed as a circuit for amplifying a potential change (voltage) of a data line inputted via a switch 6.

FIGS. 4(a) to 4(e) are timing charts of state transition of predetermined parts according to a procedure in testing the semiconductor substrate of the liquid crystal display device 1A shown in FIG. 3. The testing procedure of the second embodiment will be described with reference to the figures.

Figure 4:
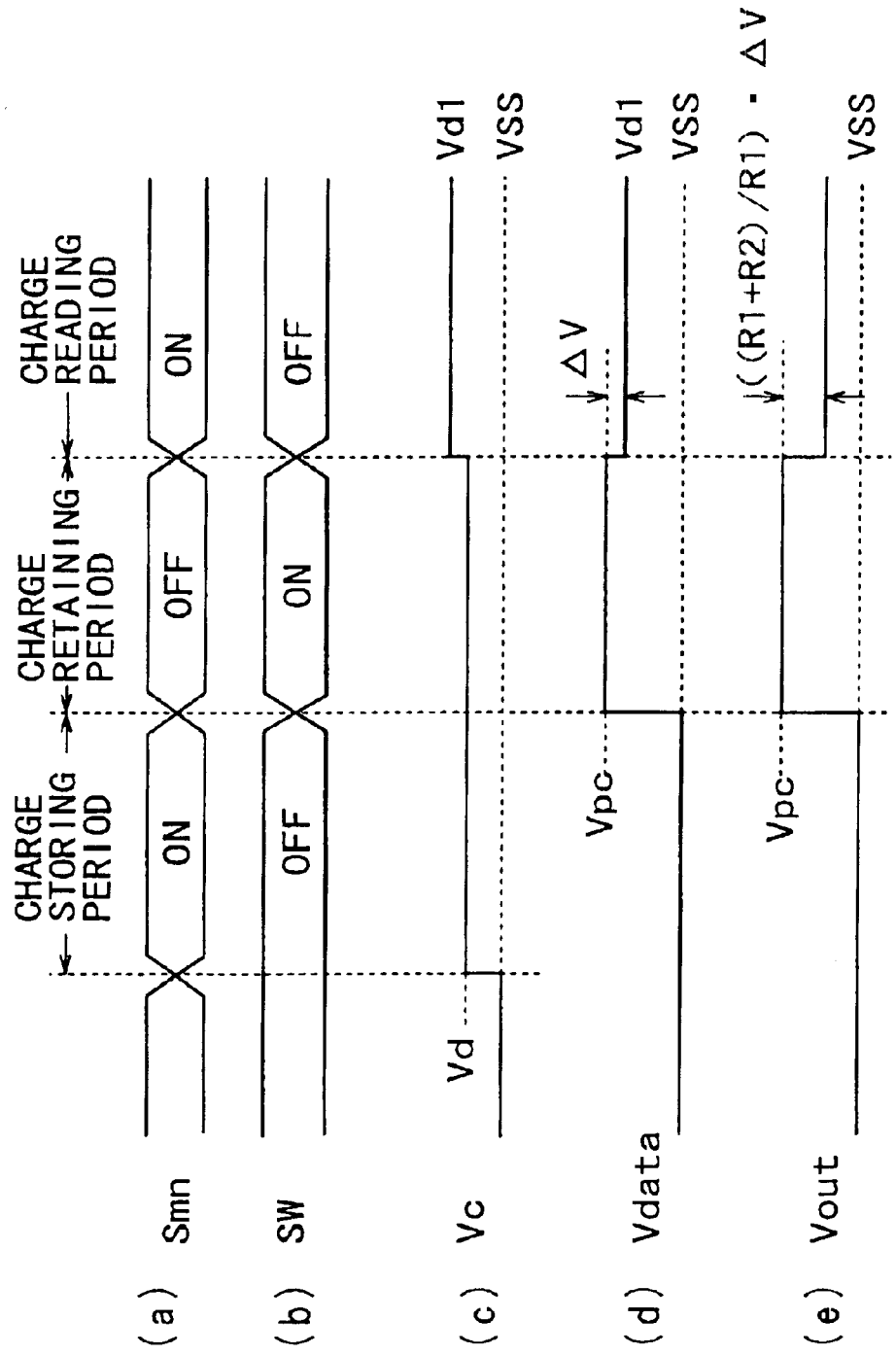
FIGS. 4(a) to 4(e) are timing charts of operations of respective parts, corresponding to a testing procedure of the second embodiment.
Figure 6:
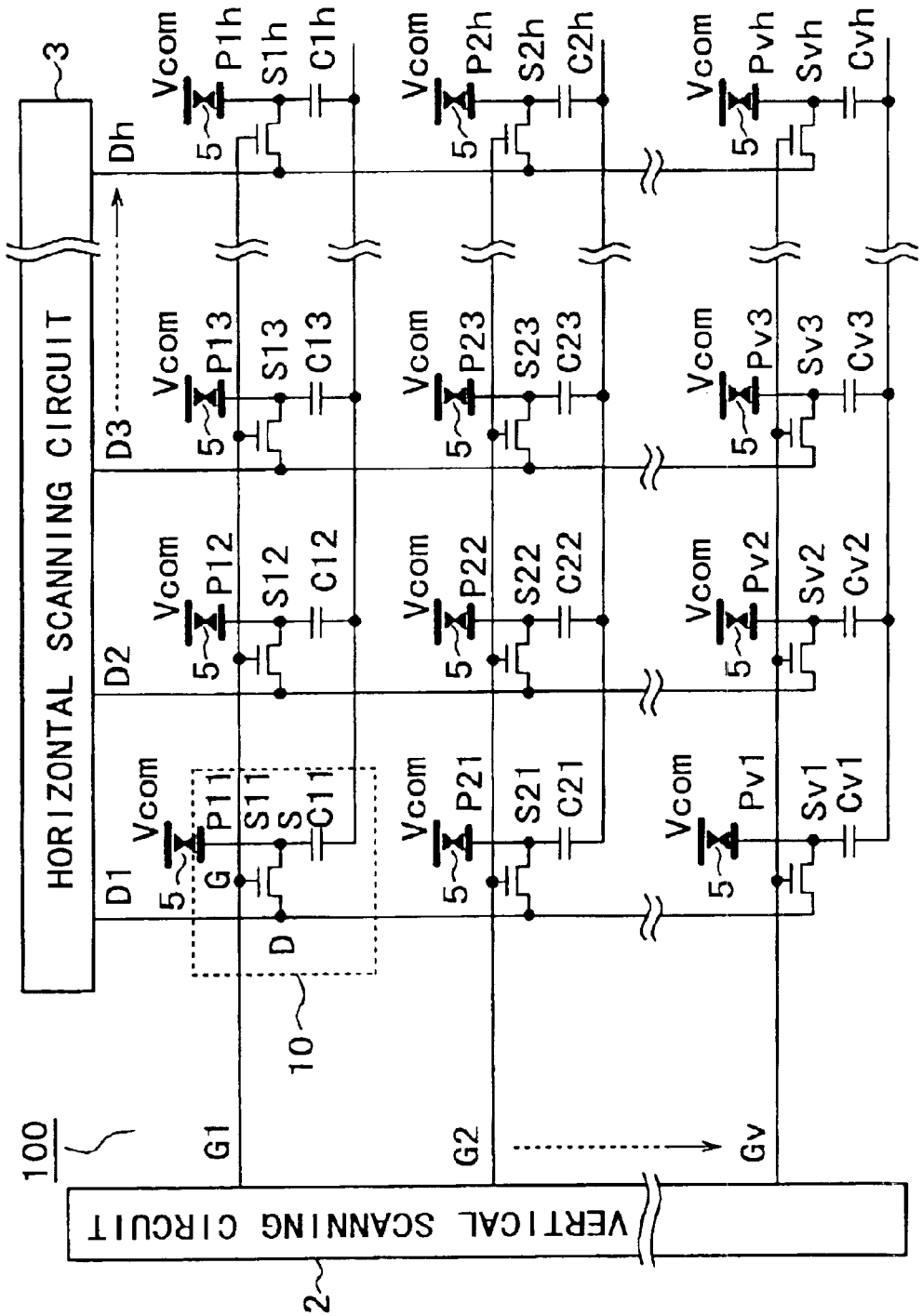
FIG. 6 is a diagram showing an example of circuit configuration of a liquid crystal display device as a conventional example.

Step 1: In the second embodiment, an object to be tested in a series of test steps is one pixel cell driving circuit. In the following, description will be made of a case where a pixel cell driving circuit 10 having a pixel switch Smn is selected as the object to be tested from pixel cell driving circuits 10 connected to a data line Dn. Therefore, in this case, control is effected such that of the switches 6, only a switch 6(n) connected to the data line Dn is turned on and the other switches 6 are turned off, whereby only the data line Dn is connected to the testing device 11. In the step 1 in this case, data is written to only a pixel capacitance Cmn within the pixel cell driving circuit 10 to be tested. For the writing of the data, the vertical scanning circuit 2 scans a gate line Gm in a charge storing period shown in FIG. 4, for example. Thereby pixel switches Smn−1, Smn, and Smn+1 connected to the gate line Gm are brought into an on state. That is, as shown in FIG. 4(a), the pixel switch Smn is in an on state in the charge storing period. In this period, the switch SW within the amplifier circuit 7 is controlled to be in an off state, as shown in FIG. 4(b). Under such conditions, a horizontal scanning circuit 3 drives the data line Dn, whereby the pixel capacitance Cmn connected to the data line Dn via the pixel switch Smn stores a charge corresponding to a value of data voltage applied from the data line Dn. That is, the data is written. In this case, as shown in FIG. 4(c), the stored charge causes a voltage across the pixel capacitance Cmn to change from a ground potential Vss to a predetermined voltage level Vd.

Step 2: After the charge is stored in the pixel capacitance Cmn as described above, as shown in a charge retaining period in FIGS. 4(a) to 4(e), the scanning of the gate line Gm by the vertical scanning circuit 2 is ended to turn off the pixel switch Smn, as shown in FIG. 4(a). At this time, as shown in FIG. 4(b), the switch SW is changed to an on state, so that the data line Dn is connected to the potential Vpc via the switch SW. Thereby the data line Dn is charged by the potential Vpc. Therefore, as shown in FIG. 4(d), the potential Vpc occurs as potential Vdata of the data line, thus resulting in a state of high impedance. In the charge retaining period when the parts are thus operated, the pixel switch Smn is turned off, and hence the charge stored in the pixel capacitance Cmn in the previous charge storing period is retained as it is. Therefore, as shown in FIG. 4(c), the voltage level Vd is maintained as the voltage across the pixel capacitance Cmn. Since the switch SW is turned on, a level corresponding to the potential Vpc appears as the output Vout of the operational amplifier OP, as shown in FIG. 4(e).

Step 3: Next, as shown in a charge reading period in FIG. 4(a), the pixel switch Smn that was in the off state in the immediately preceding charge retaining period is brought into an on state, and the switch SW that was in the on state in the immediately preceding charge retaining period is brought into an off state. In this state, the charge retained in the pixel capacitance Cmn is read from the data line Dn via the pixel switch Smn in the on state. Now let Cd be a combined capacitance of a parasitic capacitance of the data line Dn and a drain capacitance of the pixel switches connected to the data line Dn. Since in this case, a sum of the charge stored in the pixel capacitance Cmn and a charge stored in the capacitance Cd is not varied, a potential level Vd1 appearing in the data line Dn when the charge stored in the pixel capacitance Cmn is read is expressed by Vd1= (Cmn·Vd+Cd·Vpc)/(Cmn+Cd). The potential level Vd1 thus occurs, whereby as shown in FIG. 4(d), the data line potential Vdata makes a state transition from the potential level Vpc maintained in the charge retaining period to the potential level Vd1 in the next charge reading period.

Suppose that a potential difference in the data line potential Vdata between the potential level Vpc and the potential level Vd1 is expressed as Vpc−Vd1=ΔV. The operational amplifier OP operates such that a potential of the inverting input terminal also becomes Vd1. Thus, a voltage across the resistance R1 becomes ΔV and a current i1 flowing through the resistance R1 has a level expressed by i1=ΔV/R1. Then, since the current i1 flows through the resistance R2, the output Vout of the operational amplifier OP is expressed as Vout=Vpc−((R1+R2)/R1)·ΔV. That is, as shown in FIG. 4(e), the output Vout in the charge reading period is changed from the potential level Vout in the immediately preceding charge retaining period to a level having a potential difference of ((R1+R2)/R1)·ΔV. Since such operations are obtained, as is understood from a comparison between FIG. 4(d) and FIG. 4(e), the amplifier circuit 7 in the second embodiment amplifies ΔV, which is a potential change from the potential Vpc to the potential Vd1 in the data line, and then outputs the result as a greater potential change. Incidentally, an amplification factor of the amplifier circuit 7 can be adjusted by a combination of resistance values of the resistances R1 and R2.

In the second embodiment, the output Vout obtained by amplifying the data line potential as described above is inputted to the testing device 11. Thereby the second embodiment makes it possible to detect the small potential change obtained in the data line as a greater potential change. That is, even when the potential change obtained in the data line is small, the second embodiment amplifies the potential change and thus makes compensation. Thus, as with the foregoing embodiment, the second embodiment makes it possible to obtain a reliable test result even when the ratio of the data line capacitance to the pixel capacitance is high and the potential change obtained in the data line is small, for example. Further, as in the foregoing embodiment, the test can be conducted in a stage where the semiconductor substrate is fabricated before a liquid crystal is filled and incorporated.

Incidentally, even when the amplification is performed on the testing device side, for example, without the amplifier circuit 7 being formed on the semiconductor circuit substrate, for example, the potential change in the data line is similarly amplified. However, when the amplification is performed on the testing device side, for example, the potential change in the data line is affected by a capacitance, a resistive component and the like of wiring for connecting the data line of the semiconductor substrate to the testing device. Hence the potential change is weaker in a stage where the voltage in the data line is detected on the testing device side. Thus, even when amplifying the potential change, it is difficult to obtain a range of potential change sufficient to determine a defect of the pixel cell. On the other hand, when the amplifier circuit is disposed on the semiconductor substrate as in the second embodiment, effects of transmission loss caused by the wiring for connecting the semiconductor substrate to the testing device as described above can be eliminated.

A third embodiment of the present invention will next be described. FIG. 5 shows an example of circuit configuration of a liquid crystal display device 1B corresponding to the third embodiment. Incidentally, in FIG. 5, the same parts as in FIG. 1 and FIG. 3 are identified by the same reference numerals, and description thereof will be omitted. FIG. 5 mainly shows a circuit portion formed on a semiconductor substrate in a structure of the liquid crystal display device 1B. Therefore a liquid crystal layer 5, a common electrode, and a pixel electrode are not shown in FIG. 5.

The circuit configuration of the semiconductor substrate of the liquid crystal display device 1B shown in FIG. 5 includes AND gates 4 as shown in FIG. 1 and an amplifier circuit 7 as shown in FIG. 3. The thus formed circuit of the third embodiment is a combination of the circuit of the first embodiment and the circuit of the second embodiment. The test procedure is therefore a combination of the procedures described in the first embodiment and the second embodiment. The procedure in testing the semiconductor substrate of the circuit configuration shown in FIG. 5 will be described in the following.

Step 1: Also in the third embodiment, a test is conducted in steps roughly corresponding to the charge storing period→the charge retaining period→the charge reading period described with reference to FIGS. 4(a) to 4(e). In the step 1 corresponding to the charge storing period in the third embodiment, however, a plurality of arbitrary pixel switches connected to an identical data line are brought into an on state, then data is written to pixel capacitances connected to the plurality of pixel switches, and thereby charge is stored in the pixel capacitances. That is, a voltage level Vd is set to occur as a voltage Vc (FIG. 4(c)) across the plurality of pixel capacitances. Specifically, suppose in this case that three pixel switches Sm−1n, Smn, and Sm+1n connected to a data line Dn in FIG. 5 are turned on, then data is written to three pixel capacitances Cm−1n, Cmn, and Cm+1n connected to the three pixel switches Sm−1n, Smn, and Sm+1n, and thereby the voltage level Vd is generated.

Step 2: In a charge retaining period corresponding to a step 2 in this case, the pixel switches Sm−1n, Smn, and Sm+1n are turned off, so that the pixel capacitances Cm−1n, Cmn, and Cm+1n retain the charge stored therein. Therefore, also in this case, the voltage level Vd is maintained as the voltage Vc across the pixel capacitances Cm−1n, Cmn, and Cm+1n (FIG. 4(d)). Also in this case, the switch SW is changed to an on state (FIG. 4(b)). Thereby the data line Dn is charged by the potential Vpc, and the potential Vpc occurs as data line potential Vdata (FIG. 4(d)). Thus the data line Dn has a high impedance. A level corresponding to the voltage Vpc appears as output Vout of an operational amplifier OP (FIG. 4(e)).

Step 3: In a step 3 in this case, to which step the charge reading period in FIGS. 4(a) to 4(e) corresponds, the three pixel switches Sm−1n, Smn, and Sm+1n are simultaneously brought into an on state. For this, the pixels may be driven in timing shown earlier in FIGS. 2(a) to 2(g). At the same time, the switch SW is brought into an off state. Thus, in this case, a total amount of charge retained in the pixel capacitances Cm−1n, Cmn, and Cm+1n is read from the data line Dn via the three pixel switches Sm−1n, Smn, and Sm+1n in the on state. Hence a potential difference ΔV representing a change from the data line potential Vpc to a potential Vd1, as shown in FIG. 4(d), for example, can be made greater than when a charge of one pixel capacitance is read, for example. Then a result of amplification of the potential difference ΔV is obtained as the output Vout of the operational amplifier OP (FIG. 4(e)).

Thus, in the third embodiment, as in the foregoing first embodiment, charges stored in a plurality of pixel capacitances are first read simultaneously from the same data line. Thereby a greater potential change is first obtained in a stage where a potential change corresponding to the charges stored in the pixel capacitances is caused in the data line. Further, the potential change thus obtained is amplified and outputted, thus resulting in an even greater potential change. Accordingly, in the third embodiment, a range of change even greater than that of the first embodiment or the second embodiment, for example, is obtained as the potential change of the data line to be detected for the test. It is therefore possible to obtain a more reliable test result.

It is to be noted that the AND gates 4, the switches 6 and the like formed for testing in each of the foregoing embodiments do not necessarily need to be provided for all of the gate lines and the data lines. That is, the AND gates 4 and the switches 6 may be connected only in a partial region of the whole of a single wafer where the semiconductor substrate is formed, for example. In this case, though all the pixel cell driving circuits cannot be checked, only testing the partial region enables for example a tendency in terms of failures and defects of each wafer to be known, and can thus contribute sufficiently to improvement in fabrication efficiency and the like. Further, in this case, the number of AND gates 4 and switches 6 to be formed on the semiconductor substrate can be reduced greatly as compared with the case where AND gates 4 and switches 6 are provided for all of the gate lines and the data lines, for example. It is therefore possible to correspondingly reduce an occupancy rate of testing circuits per unit area of the semiconductor substrate and thereby form more pixel cell driving circuits efficiently. Also, the circuit configuration and the test procedure described in each of the foregoing embodiments are not limited to the contents described thus far, and may be modified as required depending on conditions of a test being conducted in practice or the like.

As described above, according to the present invention, in testing a semiconductor substrate forming a liquid crystal display device, charges stored in pixel capacitances connected to a plurality of pixel switches selected from all pixel switches connected to a single data line can be read simultaneously from the same single data line. The simultaneous reading of the charges of the plurality of pixel capacitances is realized by simultaneously turning on the pixel switches connected to these pixel capacitances. With such a configuration, an amount of charge of the pixel capacitances read simultaneously is increased as compared with a case where a charge of a single pixel capacitance is read, for example. Thus a potential change obtained in the data line can be made greater. Thereby even with a semiconductor substrate where a ratio of pixel capacitance to wiring capacitance is lowered with decrease in size or increase in definition of the liquid crystal display device, for example, a potential change corresponding to a defective condition of pixel cell driving circuits can be detected accurately. Hence for example testing the semiconductor substrate as it is before filling of a liquid crystal, which testing has heretofore been difficult, can be readily performed. This improves fabrication efficiency and reduces fabrication cost, for example. Also, since the present invention makes it possible to test a plurality of pixel cells simultaneously, the present invention has another effect in that test operation efficiency is improved as compared with a conventional case where pixel cells are tested one by one.

With another configuration of the present invention, a charge of a pixel capacitance which charge is read from a data line is amplified and outputted. Thus also with this configuration, a potential change in the data line, which change is a detection input, can be made greater. Accordingly, as with the foregoing invention, this invention makes it possible to obtain a correct test result even when a ratio of pixel capacitance to wiring capacitance is lowered with decrease in size or increase in definition of the liquid crystal display device.

Further, with yet another configuration of the present invention, charges stored in pixel capacitances connected to a plurality of pixel switches connected to an identical data line can be read simultaneously from the same single data line, and a potential change in the data line caused by the reading of the charges can be amplified and outputted. According to this invention, the potential change obtained in the data line is made greater by simultaneously reading the charges of the plurality of pixel capacitances from the same single data line, and further the potential change obtained in the data line is amplified, whereby the potential change is made even greater. That is, this invention enables the potential change in the data line as a detection input to be made even greater and therefore enables for example a potential change corresponding to a defective condition of pixel cell driving circuits to be detected more accurately. In addition, since a plurality of pixel cells are tested simultaneously, this invention also improves test operation efficiency as compared with the case where pixel cells are tested one by one.

Further, in each of the foregoing inventions, circuits for simultaneously turning on the pixel switches connected to the same data line or a circuit as amplifying means, which is required to realize a test, is formed on a semiconductor substrate having pixel cell driving circuits formed thereon. Hence testing the semiconductor circuit substrate as it is as described above can be performed more easily. Further, with the above configuration, by forming, on the semiconductor substrate, a switch (selecting circuit) for selecting a required data line from a plurality of data lines and connecting the data line to a testing device or the amplifying means, it is possible to reduce the number of lines extended to the testing device, for example. Further, it is not necessary to provide one amplifier circuit for each data line; it suffices to provide a single amplifier circuit for a plurality of data lines. Hence testing efficiency is correspondingly improved without wiring for testing becoming unnecessarily complex. It is further possible to reduce the area of circuits for testing formed on the semiconductor substrate and form circuits of a pixel driving system on the semiconductor substrate with higher efficiency.

What is claimed is:

1. A testing method for testing a semiconductor substrate, said semiconductor substrate being formed with pixel cell driving circuits arranged in a form of a matrix in correspondence with positions of intersection of data lines and pixel switch control lines, said pixel cell driving circuits each including a pixel switch and a pixel capacitance connected to the pixel switch, for retaining pixel data, said method characterized by comprising:

a charge retaining step for making pixel capacitances connected to a plurality of pixel switches selected from all pixel switches connected to one data line retain charge; and a detecting step for simultaneously detecting the charge retained in a plurality of the pixel capacitances in said charge retaining step from said one data line.

2. A testing method as claimed in claim 1, characterized in that:

said detecting step includes a pixel switch control step for simultaneously turning on the pixel switches connected to the plurality of pixel capacitances that retain the charge in said charge retaining step.

3. A testing method as claimed in claim 2, characterized in that:

said pixel switch control step includes:

a scanning signal output step for outputting a plurality of scanning signals corresponding to different pixel switch control lines in predetermined timing such that an overlapping period in which the plurality of scanning signals are outputted overlapping each other occurs; and a control step for controlling conduction/non-conduction of scanning signal paths such that the plurality of scanning signals are supplied to the pixel switch control lines only in a predetermined period from a predetermined time in the overlapping period.

4. A semiconductor device characterized by comprising, on a semiconductor substrate:

pixel cell driving circuits arranged in a form of a matrix in correspondence with positions of intersection of data lines and pixel switch control lines, said pixel cell driving circuits each including a pixel switch and a pixel capacitance connected to the pixel switch, for retaining pixel data;

vertical scanning means for scanning in a vertical direction by sequentially outputting a scanning signal for turning on said pixel switch to said pixel switch control lines, and for testing, generating a testing scanning signal for simultaneously turning on an arbitrary plurality of pixel switches on one of said data lines; and horizontal scanning means for scanning in a horizontal direction by applying a data signal to said data lines in predetermined timing.

5. A semiconductor device as claimed in claim 4, characterized in that:

said vertical scanning means includes:

a vertical scanning circuit for scanning in the vertical direction by sequentially outputting the scanning signal for turning on said pixel switch to said pixel switch control lines, and in testing, outputting a plurality of scanning signals corresponding to different pixel switch control lines in predetermined timing such that an overlapping period in which the plurality of scanning signals are outputted overlapping each other in one of said data lines occurs; and a conduction control circuit unit for controlling conduction/non-conduction of scanning signal paths such that said scanning signals are supplied to the pixel switch control lines only within said overlapping period.

6. A semiconductor device as claimed in claim 5, characterized in that:

in testing, said vertical scanning circuit causes said overlapping period by sequentially outputting a scanning signal having a duration longer than a scanning period for turning on one of said pixel switches to said pixel switch control lines; and said conduction control circuit is an AND circuit that outputs a logical product of the output signal of said vertical scanning circuit and a mask signal for controlling the conduction/non-conduction of said scanning signal paths, said mask signal being supplied from an external terminal in correspondence with said overlapping period.

7. A semiconductor device as claimed in claim 4, characterized in that:

a selecting circuit for alternatively selecting a data line to be connected to an external testing device from a plurality of said data lines is formed on said semiconductor substrate.

8. A display apparatus characterized by comprising:

a semiconductor substrate;

a counter substrate having a common electrode and disposed opposite to the semiconductor substrate; and a liquid crystal layer interposed between said semiconductor substrate and said counter substrate;

wherein said semiconductor substrate includes: pixel cell driving circuits arranged in a form of a matrix in correspondence with positions of intersection of data lines and pixel switch control lines, said pixel cell driving circuits each including a pixel switch and a pixel capacitance connected to the pixel switch, for retaining pixel data; vertical scanning means for scanning in a vertical direction by sequentially outputting a scanning signal for turning on said pixel switch to said pixel switch control lines, and for testing, generating a testing scanning signal for simultaneously turning on an arbitrary plurality of pixel switches on one of said data lines; and horizontal scanning means for scanning in a horizontal direction by applying a data signal to said data lines in predetermined timing.

9. A display apparatus as claimed in claim 8, characterized in that:

said vertical scanning means includes:

a vertical scanning circuit for scanning in the vertical direction by sequentially outputting the scanning signal for turning on said pixel switch to said pixel switch control lines, and in testing, outputting a plurality of scanning signals corresponding to different pixel switch control lines in predetermined timing such that an overlapping period in which the plurality of scanning signals are outputted overlapping each other in one of said data lines occurs; and a conduction control circuit unit for controlling conduction/non-conduction of scanning signal paths such that said scanning signals are supplied to the pixel switch control lines only within said overlapping period.

10. A display apparatus as claimed in claim 8, characterized in that:

a selecting circuit for alternatively selecting a data line to be connected to an external testing device from a plurality of said data lines is formed on said semiconductor substrate.

* * * * *